United States Patent [19]

Adachi

[11] 4,232,701

[45] Nov. 11, 1980

[54] FLOW DIVIDER VALVE

[75] Inventor: Yoshiharu Adachi, Gamagori, Japan

[73] Assignee: Aisin Seiki Kabushiki Kaisha, Kariya, Japan

[21] Appl. No.: 32,890

[22] Filed: Apr. 24, 1979

[30] Foreign Application Priority Data

Apr. 25, 1978 [JP] Japan ................................ 53-48852

[51] Int. Cl.³ .......................................... G05D 11/03

[52] U.S. Cl. .................................. 137/101; 137/118; 60/422

[58] Field of Search .................. 137/101, 118; 60/422

[56] References Cited

U.S. PATENT DOCUMENTS

| | | | |
|---|---|---|---|
| 2,971,523 | 2/1961 | Dudley | 137/118 |
| 3,703,186 | 11/1972 | Brewer | 137/101 |
| 3,924,650 | 12/1975 | Parquet | 137/101 |
| 3,973,580 | 8/1976 | Ueda | 137/101 |
| 3,996,742 | 12/1976 | Goff | 60/422 |
| 4,121,601 | 10/1978 | Presley | 137/101 |
| 4,154,257 | 5/1979 | Adachi | 137/101 |

*Primary Examiner*—William R. Cline
*Assistant Examiner*—H. J. Spiegel
*Attorney, Agent, or Firm*—Finnegan, Henderson, Farabow, Garrett & Dunner

[57] ABSTRACT

A valve for dividing a fluid flow at an inlet port subject to variable flow volume into two fluid flows at first and second outlet ports having a substantially constant ratio of flow volumes, including first and second flow passages from the inlet port to the first and second outlet ports. Each flow passage includes a variable orifice the openings of which are varied by fluid pressures proportional to the fluid pressure acting on opposite ends of a spool valve. A normally closed valve is provided for permitting an increase in fluid flow through the first outlet port when the inlet fluid flow exceeds a predetermined pressure.

13 Claims, 5 Drawing Figures

FLOW DIVIDER VALVE

BACKGROUND OF THE INVENTION

1. Field of the Invention

The present invention relates to flow divider valves for hydraulic systems and more particularly to flow divider valves which are adapted to divide the flow from a single pump into two flows to be supplied to independent hydraulically operated devices.

2. Description of the Prior Art

Loading vehicles such as fork lifts are generally provided with a plurality of independent, hydraulically operated devices. A fork lift vehicle, for example, has a fork lifting device, a fork tilting device, a power steering device, a brake booster, and a clutch releasing booster. In these vehicles, it is desirable that the hydraulically operated devices be supplied with hydraulic flow from a common or single pump so as to reduce the cost and the weight of the vehicle. In addition, it is desirable that the hydraulic circuits of the devices be designed as open hydraulic circuits so as to reduce the cost and weight of the vehicle.

In order to supply the hydraulic flow from the common pump to several hydraulically operated devices, flow divider valves have been developed to divide the flow from the pump into two flows to be supplied to separate hydraulic devices.

In these conventional flow divider valves, however, a sudden, large change in hydraulic pressure, or flow volume, in an inlet port due to the operation of one of the hydraulically operated devives upstream of the flow divider valve, causes a sudden, large change in the flow volume in the outlet ports. This change in the flow volume is undesirable as it adversely affects operation of hydraulic devices downstream from the flow divider valve, such as a brake booster or clutch releasing booster.

Change of flow volume to the brake or clutch releasing boosters causes a shock on the brake or clutch pedal. Especially in the clutch releasing booster, the change of flow volume may cause engagement of the vehicle clutch. This is very dangerous.

Accordingly, it is the object of the present invention to solve the above drawbacks of conventional flow divider valves.

SUMMARY OF THE INVENTION

In accordance with the invention, a valve for dividing the flow of fluid having a variable flow volume into two flows of fluid having a substantially constant ratio of flow volumes comprises a body having a cylindrical bore, an inlet port, and first and second outlet ports and a valve spool axially slidably disposed in the cylindrical bore and dividing the cylindrical bore into first and second chambers. A first passage means is provided for flow of the fluid between the inlet port and the first chamber and between the inlet port and the first outlet port comprising a first variable orifice formed by cooperation of the cylindrical bore of the body and the valve spool, the opening of the first variable orifice being varied by axial movement of the spool within the cylindrical bore, and a first orifice between the inlet port and the first variable orifice. A second passage means is provided for flow of the fluid between the inlet port and the second chamber and between the inlet port and the second outlet port, comprising a second variable orifice formed by cooperation of the cylindrical bore of the body and the valve spool, the opening of the second variable orifice being varied by axial movement of the spool within the cylindrical bore, and a second orifice between the inlet port and the second variable orifice. The fluid pressure in the first and second chambers is proportional to the pressure of the fluid at the inlet port and acts on respective opposite ends of the valve spool for axial translation of the valve spool in the cylindrical bore for varying the openings of the first and second variable orifices. Finally, the flow divider valve has a normally closed valve means subjected to the difference between fluid pressure in the inlet port and fluid pressure in the first chamber for permitting, at a predetermined value of the pressure difference, fluid flow from the second passage means for increasing fluid flow through the first outlet port.

Preferably, the valve spool has an axial bore divided into first and second spool chambers communicating with the first and second orifices, respectively, the first spool chamber being in the first passage means and the second spool chamber being in the second passage means.

The present invention is intended to provide an improved flow divider valve wherein a sudden, large change in hydraulic pressure or flow volume at the inlet port thereof does not cause a large change in flow volume in either of the outlet ports.

The present invention is further intended to provide a flow divider valve wherein the fluid flow in the inlet port is divided into two flows in first and second outlet ports having either a first or second constant ratio according to the flow volume of the inlet port.

These and other features and advantages of the present invention will become apparent from the following description taken in connection with the accompanying drawings.

DESCRIPTION OF THE PREFERRED EMBODIMENTS

In accordance with the invention, a valve for dividing the flow of a fluid having a variable flow volume into two flows of the fluid having substantially constant ratio of flow volumes includes a body having a cylindrical bore, an inlet port, and first and second outlet ports.

Figure 1:
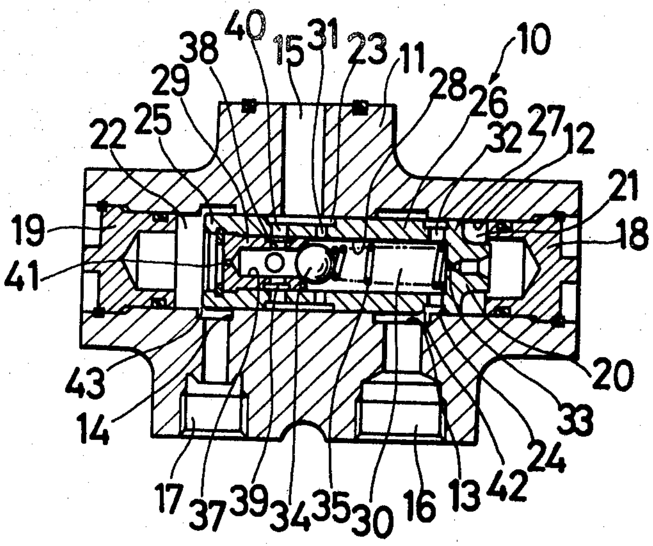
FIG. 1 is a sectional view of a first embodiment of the flow divider valve according to the present invention.

As here embodied and as may be seen in FIG. 1, the flow divider valve 10 has a body 11 having a cylindrical bore 12 passing through the body 11. Inlet port 15, first outlet port 16 and second outlet port 17 communicate with the cylindrical bore 12.

Preferably, the body 11 has a first body annular groove 13 and a second body annular groove 14 in the inner wall of the cylindrical bore 12, the body annular grooves 13 and 14 being axially spaced. As may be seen in FIG. 1, first outlet port 16 communicates with the cylindrical bore 12 through first body annular groove 13 and second outlet port 17 communicates with the cylindrical bore 12 through second body annular groove 14.

In the embodiment depicted in FIG. 1, both ends of the cylindrical bore 12 are sealed by plugs 18 and 19 which are secured to the body 11.

In accordance with the invention, a valve spool is axially slidably disposed in the cylindrical bore and divides the cylindrical bore into first and second chambers.

As embodied in FIG. 1, a valve spool 20 is axially slidably disposed in the cylindrical bore 12 dividing the cylindrical bore 12 into a first chamber 21 and a second chamber 22.

In the embodiment depicted in FIG. 1, the valve spool 20 is provided on its outer periphery with a first spool annular groove 24 and a second spool annular groove 23 which are axially spaced and form a first land 27 between the first spool annular groove 24 and the end of the valve spool 20, a second land 26 between the first spool annular groove 24 and the second spool annular groove 23, and a third land 25 between the second spool annular groove 23 and the other end of the valve spool 20.

Preferably, the valve spool 20 has an axial blind bore 28 sealingly closed by valve seat member 29 disposed in the blind bore 28 and secured to the valve spool 20.

In accordance with the invention, a first passage means is provided for flow of the fluid between the inlet port and the first chamber and between the inlet port and the first outlet port and comprises a first variable orifice formed by cooperation of the cylindrical bore of the body and the valve spool, the opening of the first variable orifice being varied by axial movement of the valve spool within the cylindrical bore, and a first orifice between the inlet port and the first variable orifice.

As embodied in FIG. 1, the first variable orifice 42 is formed by cooperation of the first body annular groove 13 in the wall of the cylindrical bore 12 of the body 11 and the second land 26 of the valve spool 20. The opening of the first variable orifice 42 is varied by axial movement of the valve spool 20 within the cylindrical bore 12. An orifice 31 in the valve spool 20 provides fluid-flow communication between the second spool annular groove 23 and the axial bore 28 in the valve spool 20. As here embodied, orifice 31 provides a restrictive effect on fluid flow.

Preferably, the axial bore 28 of the valve spool 20 is included in the first passage means. As may be seen in the embodiment of FIG. 1, an outlet orifice 32 provides fluid-flow communication between the axial bore 28 and the first spool annular groove 24. Thus, the first passage means between the inlet port 15 and the first outlet port 16 includes the orifice 31, the axial bore 28 of the spool valve 20, and the first variable orifice 42.

As here embodied, an orifice 33 communicates between axial bore 28 and first chamber 21. The first passage means, therefore, also provides flow of fluid between the inlet port 15, through second body annular groove 23, orifice 31, axial bore 28, and orifice 33 to first chamber 21.

In accordance with the invention, a second passage means is provided for flow of the fluid between the inlet port and the second chamber and between the inlet port and the second outlet port, comprising a second variable orifice formed by cooperation of the cylindrical bore of the body and the valve spool, the opening of the second variable orifice being varied by axial movement of the valve spool within the cylindrical bore, and a second orifice between the inlet port and the second variable orifice.

As seen in the embodiment of FIG. 1, a second variable orifice 43 is formed by cooperation of the second body annular groove 14 in the body 11 and the third land 25. The opening of the second variable orifice 43 is varied by axial movement of the spool valve 20 within the cylindrical bore 12.

An orifice 40 is provided in the spool valve 20 for fluid-flow communication between the second spool annular groove 23 and the spool axial bore 28.

It is preferred that the axial bore 28 of the spool valve 20 be included in the second passage means. As may be seen in FIG. 1, the axial bore 28 of the spool valve 20 communicates with the orifice 40 between the orifice 40 and the second variable orifice 43.

As here embodied, an orifice 41 communicates between axial bore 28 and second chamber 22. The first passage means, therefore, also provides flow of fluid between the inlet port 15, through second body annular groove 23, orifice 40, axial bore 28, and orifice 41 to second chamber 22. Preferably, the orifice 41 provides a restrictive effect on fluid flow.

In accordance with the invention, the fluid pressure in the first and second chambers is proportional to the pressure of the fluid at the inlet port and acts on respective opposite ends of the valve spool for axial translation of the valve spool in the cylindrical bore for varying the openings of the first and second variable orifices.

As depicted in FIG. 1, fluid introduced into first chamber 21 through orifice 33 and fluid introduced into second chamber 22 through orifice 41 acts on opposite ends of spool valve 20. The pressure in first and second chambers 21 and 22, as will be explained below, is proportional to fluid pressure at inlet port 15 because of the restrictive effect of orifice 31 and orifice 41.

In accordance with the invention, a normally closed valve means, subject to the difference in fluid pressure at the inlet port and fluid pressure in the first chamber, is provided for permitting, at a predetermined value of the pressure difference, fluid flow from the second passage means for increasing fluid flow through the first outlet port.

Preferably, the axial bore 28 of the valve spool 20 is divided into first and second spool chambers 30 and 37 communicating with the orifices 31 and 40, hereafter referred to as first and second orifices, respectively, the first spool chamber 30 being in the first passage means between the first orifice 31 and the first variable orifice 42 and the second spool chamber 37 being in the second passage means between the second orifice 40 and the second variable orifice 43.

It is also preferred that the valve means be disposed within the axial bore 28 of the valve spool 20.

In the embodiment of FIG. 1, the valve means comprises a ball valve 34 in the first spool chamber 30 biased by spring 35 in first spool chamber 30 to be seated on a conical valve seat 36 (FIG. 2) formed on one end of the valve seat member 29.

As embodied in FIG. 1, valve seat member 29 and ball valve 34 divide axial bore 28 into first spool chamber 30 and second spool chamber 37. First spool chamber 30 communicates with the inlet port 15 through first orifice 31 in the valve spool 20 and communicates with the first variable orifice 42 through the outlet orifice 32 and first spool annular groove 24. Valve seat member 29 has an axial bore extending from one end of valve seat member 29 and is separated from first spool chamber 30 by seating of ball valve 34 on valve seat 36 defining second spool chamber 37.

The second spool chamber 37 communicates with the second orifice 40 through radial holes 38 formed in the valve seat member 29 and annular groove 39 formed on the outer periphery of valve seat member 29. The second spool chamber 37 also communicates with the second variable orifice 43 through orifice 41, hereafter referred to as the third orifice, and second chamber 22.

In operation, hydraulic fluid is supplied to the inlet port 15 of the embodiment of FIG. 1 from a suitable source and flows to the first outlet port 16 passing through second spool annular groove 23, first orifice 31, first spool chamber 30, outlet orifice 32, first spool annular groove 24, first variable orifice 42, and first body annular groove 13, in order. Fluid is also transmitted through orifice 33, hereafter referred to as the fourth orifice, to first chamber 21. Simultaneously, hydraulic fluid in inlet port 15 flows to the second outlet port 17 passing through second spool annular groove 23, second orifice 40, annular groove 39 and radial holes 38 of valve seat member 29, second spool chamber 37, third orifice 41, second chamber 22, second variable orifice 43, and second body annular groove 14, in order.

First orifice 31, providing a restrictive effect on the flow through the orifice, causes hydraulic pressure $P_3$ in first spool chamber 30 to be less than hydraulic pressure $P_1$ in inlet port 15. Hydraulic pressure in the second spool chamber 37 is the same as hydraulic pressure $P_1$ since second spool annular groove 23, second orifice 40, valve seat member annular groove 39 and radial holes 38 have no restrictive effect with respect to the hydraulic flow from the inlet port 15 to the second spool chamber 37. Thus, there is a difference in pressure between the fluid in first spool chamber 30 and the fluid in second spool chamber 37.

This difference in pressure $\Delta P$ acts on the ball valve 34 so as to tend to move the ball valve 34 away from the valve seat 36 against the force of the spring 35.

Pressure $P_3$ in first spool chamber 30 communicates with first chamber 21 through fourth orifice 33 and acts on the valve spool 20 so as to urge the valve spool 20 to the left direction in FIG. 1.

Third orifice 41, providing a restrictive effect on the flow of hydraulic fluid, causes the fluid pressure in second chamber 22 to be less than that in the second spool chamber 37. Thus, hydraulic pressure $P_2$ in second chamber 22 acts on the valve spool 20 so as to urge the valve spool 20 to the right direction in FIG. 1. Since the effective area of hydraulic pressure $P_2$ acting on valve spool 20 is the same as the effective area of hydraulic pressure $P_3$ in first chamber 21 acting on the valve spool 20, when a hydraulic pressure difference between pressures $P_2$ and $P_3$ exists, valve spool 20 moves axially so as to cancel the hydraulic pressure difference by varying the openings of the variable orifices 42 and 43. Specifically, when hydraulic pressure $P_2$ in second chamber 22 is greater than hydraulic pressure $P_3$ in first chamber 21, valve spool 20 moves to the right direction in FIG. 1 according to the difference between pressure $P_2$ and $P_3$ and the opening of the second variable orifice 43 is increased while the opening of first variable orifice 42 is decreased, thereby causing decrease in the hydraulic pressure $P_2$ while increasing the hydraulic pressure $P_3$. In that situation, the valve spool 20 moves to the right direction in FIG. 1 until the hydraulic pressures $P_2$ and $P_3$ are equal. Fourth orifice 33 serves to prevent spool 20 from chattering.

Where the ball valve 34 is seated on the valve seat 36 by the force of spring 35 against the pressure difference $\Delta P$ acting on the ball valve 34, the flow quantity in the first outlet port 16 is equal to the flow quantity $Q_1$ passing through the first orifice 31 and the flow quantity in the second outlet port 17 is equal to the flow quantity $Q_2$ passing through the third orifice 31. The flow quantities $Q_1$ and $Q_2$ are expressed by the following equations:

$$Q_1 = C_1 A_1 \sqrt{\frac{2g}{\gamma} P_1 - P_3} \quad (1)$$

$$Q_2 = C_2 A_2 \sqrt{\frac{2g}{\gamma} P_1 - P_2} \quad (2)$$

Where $C_1$ is a flow coefficient of the first orifice 31, $A_1$ is the opening area of the first orifice 31, $C_2$ is the flow coefficient of the third orifice 41, $A_2$ is the opening area of the third orifice 41, $\gamma$ is the density of the hydraulic fluid and g is the gravitational acceleration.

In addition, the following equation is established in this condition:

$$Q = Q_1 + Q_2 \quad (3)$$

Where Q is the flow quantity in the inlet port 15.

Thus, since the hydraulic pressures $P_2$ and $P_3$ are equal to each other, the following equation is established from equations (1) and (2):

$$Q_1 : Q_2 = C_2 A_2 : C_1 A_1 \quad (4)$$

Therefore, in the above-mentioned condition wherein the ball valve 34 is seated on the valve seat 36, the hydraulic fluid flow supplied into the inlet port 15 is divided into two flows in the first and second outlet ports 16 and 17 in a constant ratio according to the equation (4).

The terms $(P_1-P_3)$ and $(P_1-P_2)$ in the equations (1) and (2) are the same as the hydraulic pressure difference value $\Delta P$. The hydraulic pressure difference value $\Delta P$, therefore, is expressed by the following equation according to equations (1), (2) and (3):

$$\Delta P = BQ^2 \quad \text{where, } B = \frac{\gamma}{2g(C_1 A_1 + C_2 A_2)^2} \quad (5)$$

It is apparent from equation (5) that the hydraulic pressure difference value $\Delta P$ is in proportion to the square of the hydraulic flow quantity Q.

The following equation is established from the equations (1) to (3).

$$Q_2 = \frac{Q}{\left(1 + \frac{C_1 A_1}{C_2 A_2}\right)} \quad (6)$$

From equation (6), it is apparent that the flow quantity $Q_2$ is in proportion to the hydraulic flow quantity Q.

The minimum value $\Delta P_o$ of the hydraulic pressure difference value $\Delta P$ which is able to move the ball valve 34 away from the valve seat 36, is expressed by the following equation:

$$\Delta P_o = 4F_o/\pi D^2 \quad (7)$$

Where D is the sealing effective diameter of the ball valve 34, $\pi$ is the circular constant, and $F_o$ is the force of the spring 35.

The flow quantity $Q_o$ in the inlet port 15 which will cause the pressure difference value $\Delta P_o$ is expressed by the following equation according to equations (5) and (7):

$$Q_o = \sqrt{\frac{\Delta P_o}{B}} \quad (8)$$

Figure 2:
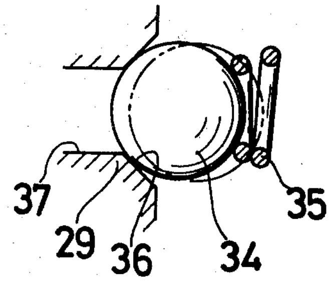
FIG. 2 is an enlarged, fragmentary view of the ball valve in the embodiment of FIG. 1.

Thus, when the hydraulic fluid-flow quantity Q supplied into the inlet port 15 increases above the flow quantity $Q_o$, the ball valve 34 is moved away from the valve seat 36 by the pressure difference $\Delta P$, as shown in FIG. 2 by the dashed line, thereby causing hydraulic fluid flow of flow quantity $Q_3$ from the second spool chamber 37 into the first spool chamber 30 passing through the passage formed between the ball valve 34 and the valve seat 36. The hydraulic fluid flow of the flow quantity $Q_3$, together with the flow quantity $Q_1$, flows to the first outlet port 16 and avoids the increase of the hydraulic pressure $P_1$ according to the increase of the flow quantity Q so as to prevent the pressure difference value $\Delta P$ from increasing when the flow quantity Q increases. Furthermore, an increase in the flow quantity $Q_2$ due to an increase in the flow quantity Q is avoided because of the flow quantity $Q_3$.

The flow quantity $Q_3$ is expressed by the following equation:

$$Q_3 = C_3 A_3 \sqrt{\frac{2g}{\gamma} \Delta P} \quad (9)$$

Where $C_3$ and $A_3$ are the flow coefficient and the flow course area, respectively, of the passage formed between the ball valve 34 and the valve seat 36.

The term $A_3$ in equation (9) is expressed by the following equation:

$$A_3 = \pi DX \sin\theta \quad (10)$$

Where X is the amount of axial movement of the ball valve 34 and $\theta$ is the slant angle of the valve seat 36 in respect to its axis.

Figure 3:
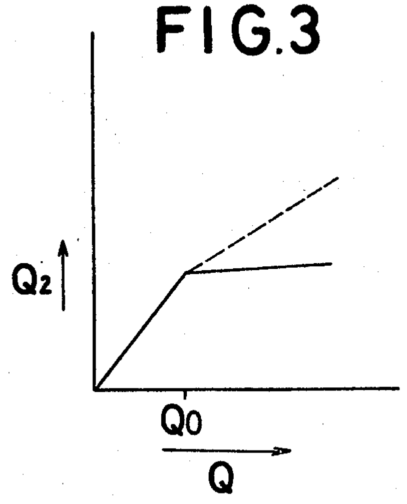
FIG. 3 is a graph showing the flow volume in a second port of the flow divider valve shown in FIG. 1 with respect to the flow volume at the inlet port of the flow divider valve shown in FIG. 1.

FIG. 3 schematically shows the flow quantity $Q_2$ with respect to the flow quantity Q. The solid line shows the relation between the flow quantity Q and $Q_2$ where $A_3$, expressed by equation (10), is designed to be large enough to avoid an increase in hydraulic pressure due to an increase in flow quantity Q. The dotted line shows the relation between Q and $Q_2$ where $A_3$ is designed to be smaller.

Figure 4:
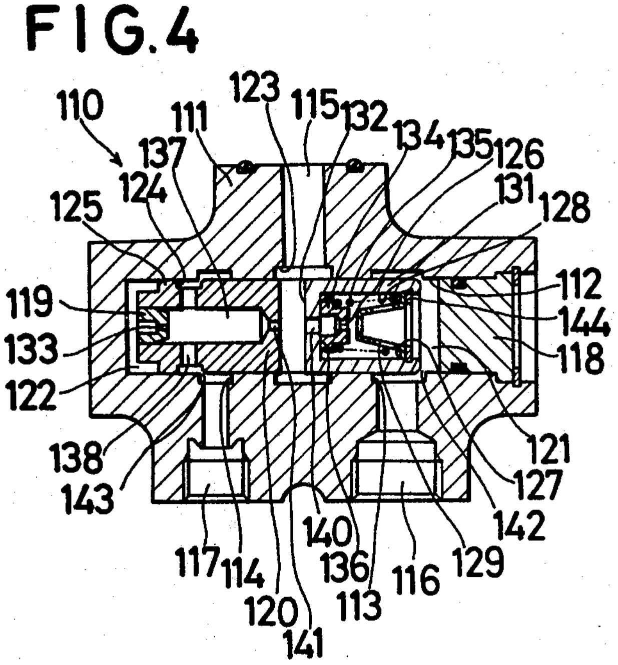
FIG. 4 is a sectional view similar to FIG. 1, but showing a second embodiment of the flow divider valve according to the present invention.

Referring to FIG. 4, a second embodiment of the flow divider valve according to the present invention is depicted. The flow divider valve 110 comprises the body 111 having a cylindrical bore 112 axially extending from one end face of the body 111, an inlet port 115 and first and second outlet ports 116 and 117.

Preferably, the body 111 has a first body annular groove 113 communicating with the first outlet port 116, a second body annular groove 123 communicating with the inlet port 115, and a third body annular groove 114 communicating with the second outlet port 117.

One end of the bore 112 is sealingly closed by plug 118 secured to the body 111.

In accordance with the invention, a valve spool 120 is axially slidably disposed in the bore 112 dividing the bore 112 into first and second chambers, 121 and 122.

The valve spool 120 is preferably provided on its outer periphery with a spool annular groove 124 defining a first land 126 between the annular groove 124 and the first end of the spool valve 120 and a second land 125 between the annular groove 124 and the second end of the valve spool 120.

Preferably, the valve spool 120 has an axial bore divided into a first spool chamber 128 and a second spool chamber 137 by a wall 136 having a radial bore 132. The radial bore 132 communicates with the inlet port 115 through the second body annular groove 123.

As here embodied, the first passage means for flow of the fluid between the inlet port 115 and the first outlet port 116 includes a first variable orifice 142 formed by cooperation of the first annular groove 113 of the body 111 with the first end of land 126 of the spool valve 120. The first passage means also includes a first orifice 131. First passage means also includes an open end to valve spool 120 providing communication between first spool chamber 130 and first chamber 121.

Preferably, a fourth orifice 140 is provided in the wall 136 for communication between the radial bore 132 and the first spool chamber 128.

In the second embodiment of FIG. 4, the valve means comprises a cup-shaped valve 134 in first spool chamber 128 biased by spring 135 to be seated on wall 136 around fourth orifice 140. First orifice 131 is provided in the base of cup-shaped valve 134. First orifice 131 is designed to have a restrictive effect on the flow of fluid.

A cup-shaped retainer 127 is attached to the valve spool 120 by means of a snap ring 144. The cup-shaped retainer 127 is provided with a plurality of holes 129 which allow fluid flowing from the radial bore 132 through the fourth orifice 140, the first orifice 131, and the first spool chamber 128 to flow through an opening at the first end of the spool valve 120 communicating with the first chamber 121. The holes 129 in the retainer 127 have no restrictive effect on the flow of fluid.

The first passage means, therefore, includes the inlet port 115, the second body annular groove 123, the radial bore 132, the fourth orifice 140, the first orifice 131, the first spool chamber 128, holes 129 in retainer 127, the open first end of the valve spool 120, the first chamber 121, the first variable orifice 142, the first body annular groove 113, and the outlet port 116.

The second passage means for flow of the fluid between the inlet port and the second outlet port of the embodiment, depicted in FIG. 4, includes a second variable orifice 143 formed by cooperation of the third body annular groove 114 with the other end of first land 126 of the spool valve 120, the opening of the second variable orifice being varied by the axial movement of the spool valve 120 within the cylindrical bore 112. The second passage means also includes a second orifice 141 opposite the fourth orifice 140 communicating between the radial bore 132 and the second spool chamber 137. The second spool chamber 137 also communicates with the second chamber 122 through third orifice 133 formed in a plug 119 sealingly secured to the valve spool 120. Second orifice 141 provides a restrictive effect on fluid flow.

The second passage means of the embodiment of FIG. 4 includes the inlet port 115, the second body annular groove 123, the radial bore 132, the second orifice 141, the second spool chamber 137, the outlet orifice 138, the spool annular groove 124, the second variable orifice 143, the third body annular groove 114 and the outlet port 117.

In this embodiment, the fourth orifice 140 has a non-restrictive opening larger than the restrictive area of the first orifice 131.

In operation, hydraulic fluid flow being supplied into the inlet port 115 in the embodiment of FIG. 4 normally flows to the first outlet port 116 passing through second body annular groove 123, radial bore 132, fourth orifice 140, first orifice 131, first spool chamber 128, holes 129 in retainer 127, first chamber 121, first variable orifice 142, and first body annular groove 113, in order.

Simultaneously, hydraulic fluid in the inlet port 115 flows to the second outlet port 117 passing through second body annular groove 123, radial bore 132, second orifice 141, second spool chamber 137, outlet orifice 138, spool annular groove 124, second variable orifice 143, and third body annular groove 114, in order A pressure difference is developed between the fourth orifice 140 and the first spool chamber 128 because of the restrictive effect of the first orifice 131. This hydraulic pressure difference acts on the valve 134 so as to move the valve 134 away from its seat on wall 136 against the force of spring 135.

The hydraulic pressure in first spool chamber 128 communicates with the first chamber 121 through the opened first end of valve spool 120 and acts on the valve spool 120 so as to urge the valve spool 120 toward the left direction in FIG. 4.

Hydraulic pressure in second spool chamber 137 is less than hydraulic pressure in inlet port 115 because of the restrictive effect of the second orifice 141. The pressure in second spool chamber 137 communicates with the second chamber 122 through the third orifice 133 and acts on the valve spool 120 so as to urge the valve spool 120 toward the right direction in FIG. 4.

The valve spool 120, therefore, will be moved in accordance with the hydraulic pressure difference as the valve spool 20 in the foregoing first embodiment so that the hydraulic fluid flow supplied to the inlet port 115 is divided into two flows in first and second outlet ports 116 and 117 in a first constant ratio according to the first and second orifices 131 and 141.

The value of the hydraulic pressure difference between the fourth orifice 140 and the first spool chamber 128 increases in accordance with the increase the hydraulic fluid flow volume in the inlet port 115. When the flow volume in the inlet port 115 increases above a predetermined value, such as flow quantity $Q_o$ in the foregoing first embodiment, the valve 134 is moved away from its seat on wall 136 by the hydraulic pressure difference between the fourth orifice 140 and the first spool chamber 128. Thus, the fourth orifice 140 comes into effect with respect to the flow from the inlet port 115 to the first outlet port 116 and the first orifice 131 has no effect. Therefore, the hydraulic fluid flow supplied into the inlet port 115 is divided into two flows in first and second outlet ports in a second constant ratio according to the second and fourth orifices, 141 and 140.

Where the fourth orifice 140 is designed to be large enough to avoid an increase in hydraulic pressure in the inlet port 115 due to an increase of the flow volume in inlet port 115, the flow quantity in the second outlet port 117 is prevented from increasing above a predetermined value.

Figure 5:
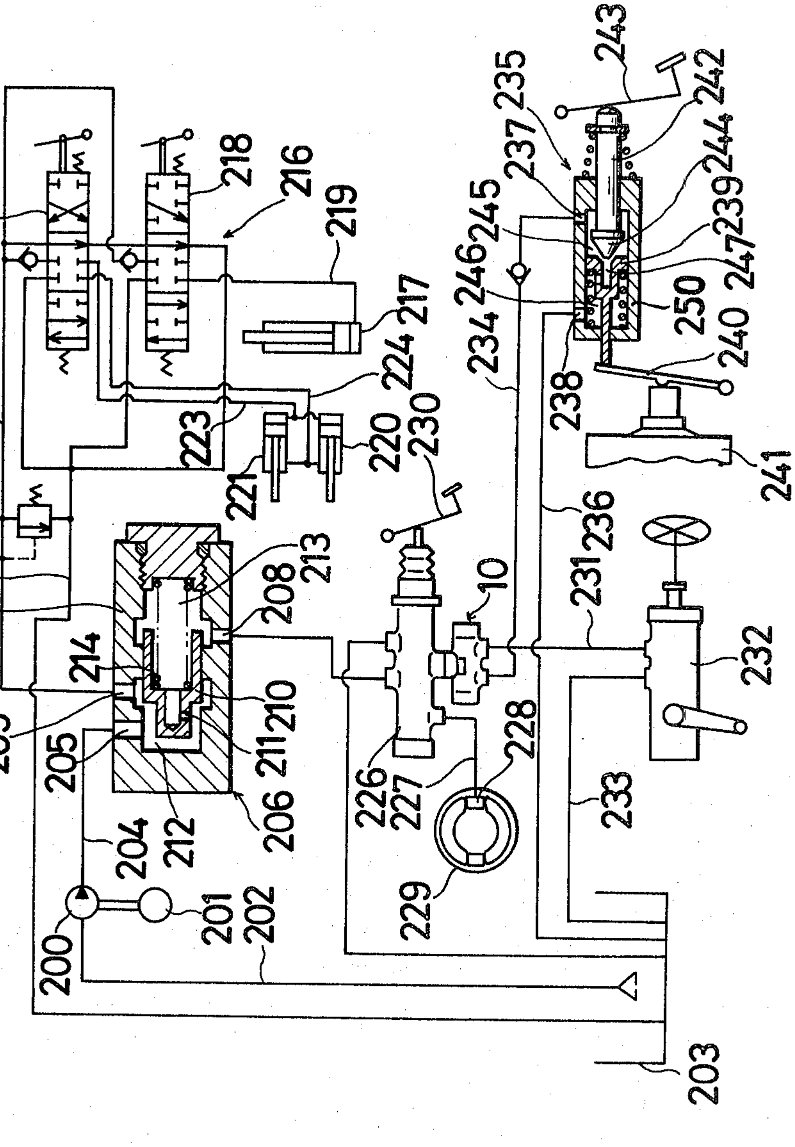
FIG. 5 is a schematic diagram of a hydraulic system for a fork lift vehicle incorporating the flow divider valve of FIG. 1.

Referring to FIG. 5, there is shown a hydraulic system of a fork lift vehicle incorporating the flow divider valve 10 of the instant invention.

The hydraulic system comprises a pump 200 driven by a vehicle engine 201. A suction line 202 of the pump 200 communicates with a reservoir 203 and a discharge line 204 of the pump 200 communicates with the inlet port 205 of a conventional flow divider valve 206. The pump 200 sends hydraulic fluid of a flow quantity according to the operation speed of the vehicle engine 201 from the reservoir 203 to the flow divider valve 206 during the operation of the vehicle engine 201.

The flow divider valve 206 comprises a body 207 having an inlet port 205 and two outlet ports 208 and 209, a valve spool 210 axially slidably disposed in the body 207 and having an orifice 211 which communicates between chambers 212 and 213, and a coil spring 214 urging the valve spool 209 toward the left direction in FIG. 5. The flow divider valve 206 normally divides the hydraulic fluid flow from the pump 200 into a first flow of a constant volume in the outlet port 208 and a second flow in the outlet port 209.

The second flow is supplied through a line 215 to a fork tilting and lifting device 216, including a fork lifting cylinder 217 associated with a manually operated valve 218 through a line 219. The fork lifting and tilting device 216 also includes a pair of fork tilting cylinders 220 and 221 associated with a manually operated valve 222 through a pair of lines 223 and 224.

In a normal condition, wherein valves 218 and 222 are shifted into neutral positions, the second flow returns to the reservoir 203 passing through the line 215, the device 216, and an exhaust line 225 without increasing in pressure.

The first flow in the outlet port 208 of the flow divider valve 206 is supplied to a brake pressure control valve 226 associated through line 227 with slave cylinders 228 of wheel brakes 229, only one of which is illustrated in FIG. 5. The brake pressure control valve 226 is operatively connected to a brake pedal 230.

Under normal conditions, wherein brake pedal 230 has been released, the first flow from flow divider valve 206 flows into inlet port 15 of the flow divider valve 10 passing through brake pressure control valve 226 without an increase in pressure.

Flow divider valve 10, as shown in FIG. 1, divides the first flow into third and fourth flows in first and second outlet ports 16 and 17, respectively. The third flow returns to reservoir 203 passing through line 231, a conventional power steering unit 232 and an exhaust line 233, in order.

The fourth flow out of the flow divider valve 10 returns to reservoir 203 passing through a line 234, clutch-releasing booster 235 and an exhaust line 236, in order.

The clutch-releasing booster 235 includes a body 250 having inlet and outlet ports 237 and 238, a power piston 239 axially slidably disposed in body 250 and operatively connected to a clutch-releasing lever 240 associated with a vehicle clutch 241, and an input rod 242 axially slidably passed through an end wall of the body 250 and operatively connected to a clutch pedal 243.

The input rod 242 is provided with a valve portion 244 for restricting the fluid flow from chamber 245 communicating with inlet port 237 through passage 247 formed in the power piston 239 to chamber 246 communicating with the outlet port 238.

In the hydraulic system of FIG. 5, fork lifting and tilting device 216 is operated in conjunction with the operation of clutch-releasing booster 235. When clutch-releasing booster 235 is operating without operation of fork lift device 216, valve spool 210 of conventional flow divider 206 is urged to the left in FIG. 5. In this condition, when device 216 is operated, hydraulic pressure in line 215 suddenly increases to a higher pressure, and the hydraulic pressure in chamber 212 increases to a high pressure according to the increase of the pressure in line 215 moving valve spool 210 to the right direction in FIG. 5. Thus, the flow volume of the first flow through outlet port 208 suddenly increases because of the reduction in the capacity of chamber 213. This flow volume is about three times the normal flow volume.

When this sudden increase in volume of fluid reaches flow divider 10, operation of the instant invention prevents a sudden increase in the flow through line 234 to clutch 235.

The invention provides a flow divider capable of receiving sudden surges of flow volume at an inlet port and dividing that flow into two outlet flows having a substantially constant ratio while attenuating the flow.

It will apparent to those skilled in the art that various modifications and variations could be made in the divider valve of the invention without departing from the scope or spirit of the invention. What is claimed is:

1. A valve for dividing the flow of a fluid having a variable flow volume into two flows of said fluid having a substantially constant ratio of flow volumes, comprising:

(a) a body having a cylindrical bore, an inlet port, and first and second outlet ports;

(b) a valve spool axially slidably disposed in said cylindrical bore and dividing said cylindrical bore into first and second chambers;

(c) first passage means for flow of said fluid between said inlet port and said first chamber, and between said inlet port and said first outlet port, including:

(1) a first variable orifice formed by cooperation of the cylindrical bore of said body and said valve spool, the opening of said first variable orifice being varied by axial movement of said spool within said cylindrical bore; and (2) a first orifice between said inlet port and said first variable orifice;

(d) second passage means for flow of said fluid between said inlet port and said second chamber and between said inlet port and said second outlet port, including:

(1) a second variable orifice formed by cooperation of the cylindrical bore of said body and said valve spool, the opening of said second variable orifice being varied by axial movement of said spool within said cylindrical bore; and (2) a second orifice between said inlet port and said second variable orifice;

(e) the fluid pressure in said first and second chambers being proportional to the pressure of said fluid at said inlet port and acting on respective opposite ends of said valve spool for axial translation of said valve spool in said cylindrical bore for varying the openings of said first and second variable orifices; and (f) normally closed valve means subjected to the difference between fluid pressure at said inlet port and fluid pressure in said first chamber for permitting, at a predetermined value of said pressure difference, fluid flow from said second passage means for increasing fluid flow through said first outlet port.

2. The valve of claim 1 wherein said valve spool has an axial bore and wherein each said first and second passage means also includes the axial bore of said valve spool.

3. The valve of claim 2 wherein the axial bore of said valve spool is divided into first and second spool chambers communicating with said first and second orifices, respectively, said first spool chamber being in said first passage means between said first orifice and said first variable orifice and said second spool chamber being in said second passage means between said second orifice and said second variable orifice.

4. Th valve of claim 3 wherein said valve means is disposed within the axial bore of said valve spool.

5. The valve of claim 4 wherein said valve means is disposed between said first and second spool chambers, and wherein said increased fluid flow through said first outlet port is from said second spool chamber to said first spool chamber.

6. The valve of claim 5 wherein said first passage means includes a fourth orifice communicating between said first spool chamber and said first chamber and said second passage means includes a third orifice communicating between said second spool chamber and said second chamber, said second chamber communicating with said second variable orifice.

7. The valve of claim 6 wherein said valve means comprises an annular valve seat secured to the axial bore of said spool valve, a ball valve in said first spool chamber, and a spring in said first spool chamber biasing said ball valve to said valve seat, said valve seat and ball valve dividing the axial bore of said valve spool into said first and second spool chambers.

8. The valve of claim 4 wherein said first passage means includes an open end of said valve spool communicating between said first spool chamber and said first chamber and said second passage means includes a third orifice communicating between said second spool chamber and said second chamber, said first chamber communicating with said first variable orifice.

9. The valve of claim 8 also including a wall dividing the axial bore of said spool valve into said first and second spool chambers, said wall having a radial bore communicating with said inlet port, and wherein said second orifice provides fluid-flow communication between said second spool chamber and said radial bore and wherein a fourth orifice provides fluid-flow communication between said first spool chamber and said radial bore.

10. The valve of claim 9 wherein said valve means is disposed in said first spool chamber between said fourth orifice and said first variable orifice, and wherein said increased fluid flow through said first outlet port is from said inlet port to said first spool chamber.

11. The valve of claim 10 wherein said valve means comprises the wall around said fourth orifice inside said first spool chamber serving as a valve seat, a cup-shaped valve in said first spool chamber having said first orifice in the bottom thereof spaced from and coaxial with said fourth orifice, and a spring in said first spool chamber biasing said cup-shaped valve to said valve seat.

12. A valve for dividing the flow of a fluid having a variable flow volume into two flows of said fluid having a substantially constant ratio of flow volumes, comprising:

(a) a body having a cylindrical bore closed at opposite ends thereof, an inlet port, spaced first and second annular grooves in the wall of said cylindrical bore, and first and second outlet ports communicating with said cylindrical bore through said first and second body annular grooves, respectively;

(b) a valve spool having first and second ends axially slidably disposed in said cylindrical bore and dividing said cylindrical bore into first and second chambers, said valve spool having an axial bore coaxial with said cylindrical bore;

(c) a ball valve normally biased closed disposed within said axial bore and dividing said axial bore into first and second spool chambers, said valve being subjected to the difference between fluid pressure at said inlet port and in said first chamber and permitting at a predetermined value of said pressure difference fluid flow from said second spool chamber to said first spool chamber;

(d) a spring in said first spool chamber for biasing said ball valve closed;

(e) said valve spool having (1) spaced first and second annular grooves in the outside surface thereof forming a first land between said first spool annular groove and the first end of said spool, a second land between said first and second spool annular grooves, and a third land between said second spool annular groove and the second end of said spool, said second spool annular groove communicating with said inlet port;

(2) an outlet orifice communicating between said first spool chamber and said first spool annular groove;

(3) a first orifice communicating between said second spool annular groove and said first spool chamber for fluid-flow communication between said inlet port and said first spool chamber, said first orifice having a restrictive effect on the flow of said fluid for providing a reduced fluid pressure in said first spool chamber;

(4) a second orifice communicating between said second spool annular groove and said second spool chamber for fluid-flow communication between said inlet port and said second spool chamber;

(5) a third orifice in said second end of said valve spool communicating between said second spool chamber and said second chamber, said third orifice having a restrictive effect on the flow of said fluid for providing a reduced fluid pressure in said second chamber;

(6) a fourth orifice in said first end of said valve spool communicating between said first spool chamber and said first chamber;

(7) said second land cooperating with said first body annular groove to form a first variable orifice for fluid-flow communication from said first spool chamber through said outlet orifice, said first spool annular groove and said first body annular groove to said first outlet port;

(8) said third land cooperating with said second body annular groove to form a second variable orifice for fluid-flow communication between said second chamber and said second outlet port through said second body annular groove, the openings of said first and second variable orifices being varied by axial translation of said spool valve in said cylindrical bore due to fluid pressure differences in said first and second chambers;

whereby fluid flowing through said inlet port is divided into first and second flow paths to said first and second outlet ports, respectively, said first flow path including said inlet port, said second spool annular groove, said first orifice, said first spool chamber, said outlet orifice, said first spool annular groove, said first variable orifice, and said first body annular groove to first outlet port, and said second flow path includes said inlet port, said second spool annular groove, said second orifice, said second spool chamber, said third orifice, said second chamber, said second variable orifice, and said second body annular groove to said second outlet port.

13. A valve for dividing the flow of a fluid having a variable flow volume into two flows of said fluid having a substantially constant ratio of flow volumes, comprising:

(a) a body having a cylindrical bore closed at opposite ends thereof, spaced first, second and third annular grooves in the wall of said cylindrical bore, an inlet port communicating with said cylindrical bore through said second body annular groove, and first and second outlet ports communicating with said cylindrical bore through said first and third body annular grooves, respectively;

(b) a valve spool having first and second ends axially slidably disposed in said cylindrical bore and dividing said cylindrical bore into first and second chambers, said valve spool having an axial bore coaxial with said cylindrical bore;

(c) a transverse wall in said valve spool dividing said axial bore into first and second spool chambers, said wall having a radial bore communicating with said inlet port through said second body annular groove;

(d) said valve spool having (1) an annular groove in the outside surface thereof forming a first land between the first end of said spool valve and the spool annular groove and a second land between the spool annular groove and the second end of said spool valve;

(2) an opening at the first end of said spool valve communicating between said first spool chamber and said first chamber;

(3) a second orifice communicating between said radial bore and second spool chamber;

(4) a third orifice in the second end of said spool valve communicating between said second spool chamber and said second chamber;

(5) a fourth orifice communicating between said radial bore and said first spool chamber;

(6) an outlet orifice communicating between said second spool chamber and said spool annular groove;

(7) said first land at the first end of the spool valve cooperating with said first body annular groove to form a first variable orifice for fluid-flow communication between from first chamber through said first body annular groove to said first outlet port;

(8) the other end of said first land proximate the second end of said spool valve cooperating with said third body annular groove to form a second variable orifice for fluid-flow communication from said second spool chamber through said outlet orifice, and said spool annular groove to said second outlet port through said third body annular groove, the openings of said first and second variable orifices being varied by axial translation of said spool valve in said cylindrical bore due to fluid pressure differences in said first and second chambers;

(e) a cup-shaped valve normally biased against a seat around said fourth orifice disposed in said first spool chamber having in its base a first orifice spaced from and coaxial with said fourth orifice providing fluid-flow communication from said radial bore through said first and fourth orifices to said first spool chamber, said cup-shaped valve being subjected to the difference in fluid pressures in said inlet port and in said first chamber and permitting at a predetermined value of said pressure difference an increase in fluid flow from said radial bore into said first spool chamber;

whereby fluid flowing through said inlet port is divided into first and second flow paths to said first and second outlet ports, respectively, said first flow path including said inlet port, said second body annular groove, said radial bore, said fourth orifice, said first orifice, said first spool chamber, said opening, said first chamber, said first variable orifice, and said first body annular groove to said first outlet port, and said second flow path includes said inlet port, said second body annular groove, said radial bore, said second orifice, said second spool chamber, said outlet orifice, said spool annular groove, said second variable orifice, and said third body annular groove to said outlet port.

* * * * *